US006809763B1

(12) United States Patent
Yoshida

(10) Patent No.: US 6,809,763 B1
(45) Date of Patent: Oct. 26, 2004

(54) IMAGE PICKUP APPARATUS AND METHOD OF CORRECTING DETERIORATED PIXEL SIGNAL THEREOF

(75) Inventor: Hideaki Yoshida, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 1002 days.

(21) Appl. No.: 09/629,983

(22) Filed: Jul. 31, 2000

(30) Foreign Application Priority Data

Aug. 2, 1999 (JP) ............................................ 11-218598

(51) Int. Cl.[7] .......................... H04N 9/64; H04N 5/235; H04N 1/40
(52) U.S. Cl. ..................... 348/248; 348/222.1; 358/448
(58) Field of Search ................. 348/248, 241, 348/243, 222.1, 246, 251, 256; 358/447, 448, 450, 461, 463

(56) References Cited

U.S. PATENT DOCUMENTS

| | | | | |
|---|---|---|---|---|
| 4,608,608 A | * | 8/1986 | Nishizawa et al. | 348/248 |
| 4,816,917 A | * | 3/1989 | Yamamoto et al. | 348/257 |
| 5,153,732 A | * | 10/1992 | Oda et al. | 348/243 |
| 5,181,118 A | * | 1/1993 | Kimura | 358/461 |
| 5,327,246 A | * | 7/1994 | Suzuki | 348/246 |
| 5,440,341 A | * | 8/1995 | Suzuki et al. | 348/256 |
| 5,485,205 A | * | 1/1996 | Miyata | 348/248 |
| 5,659,355 A | * | 8/1997 | Barron et al. | 348/245 |
| 5,883,667 A | * | 3/1999 | Taniji | 348/248 |
| 6,157,407 A | * | 12/2000 | Kobayashi | 348/241 |
| 6,618,084 B1 | * | 9/2003 | Rambaldi et al. | 348/247 |

FOREIGN PATENT DOCUMENTS

| | | | | |
|---|---|---|---|---|
| JP | 58-025774 | * | 2/1983 | ............ H04N/5/18 |
| JP | 60-217764 | * | 10/1985 | .......... H04N/5/335 |
| JP | 05-176236 | * | 7/1993 | .......... H04N/5/335 |
| JP | 06-269822 | * | 9/1994 | .......... H04N/5/335 |

* cited by examiner

*Primary Examiner*—Andrew Christensen
*Assistant Examiner*—Nhan Tran
(74) *Attorney, Agent, or Firm*—Westerman, Hattori, Daniels & Adrian, LLP

(57) ABSTRACT

An image pickup apparatus is constructed as including: a smear level detecting section for detecting smear components of CCD image pickup device; a smear correcting section for correcting effective pixel signals based on the detected smear components; an output deteriorated pixel determining section for determining corresponding effective signal pixels as output deteriorated pixels when the level of smear component has reached a predetermined value; a compensation condition determining section for determining whether an output deteriorated pixel satisfies predetermined compensation conditions or not; and a data compensating section for performing data compensation of pixels determined as satisfying the compensation conditions by using information of neighboring pixels, the other pixels determined as not satisfying the compensation conditions at the compensation condition determining section being subjected to correction at the smear correcting section.

10 Claims, 2 Drawing Sheets

IMAGE PICKUP APPARATUS AND METHOD OF CORRECTING DETERIORATED PIXEL SIGNAL THEREOF

This application claims benefit of Japanese Application No. Hei 11-218598 filed in Japan on Aug. 2, 1999, the contents of which are incorporated by this reference.

BACKGROUND OF THE INVENTION

The present invention relates to image pickup apparatus, and more particularly relates to an image pickup apparatus having a function for correcting false signals and to method of correcting deteriorated pixel signal thereof.

There is a problem in conventional solid-state image pickup apparatus using CCD image pickup device that image quality is deteriorated due to smears which occur as a phenomenon peculiar to CCD image pickup devices when an intense light has been incident thereupon. In particular, such phenomenon occurs as charge not captured at its true charge accumulating region is caused to leak into the vertical transfer line across the potential barrier. If caused by an ordinary and steady light, such phenomenon occurs over a vertical transfer period. In the case of a spot light, for example, it results in a vertical stripe extended up and down therefrom. Also, if the image object includes a horizontally extended bright portion such as a scenic view containing the sky, a flare-like whitish image over the frame as a whole is the outcome.

A method such as one disclosed in Japanese patent application laid open Hei-7-67038 has been known as the method for correcting such phenomenon. Noticing the fact that a smear occurs substantially at the same level along the vertical direction due to the principle of its occurrence, the output level of vertical OB (optical black) pixels, i.e., an optically concealed accumulating pixel region outside the effective pixel region, is determined as a smear eliminating reference signal which is subtracted from the pixel output signals of an effective frame.

An occurrence of large smear component, however, results in a disadvantage of image quality deterioration due to the correction to the contrary in the case where smear correction is simply employed by using the above described prior-art technique, since there is a limit in the output range of the image pickup device to be actually used in a camera. This will be explained by way of a specific example as follows. Suppose a state where a vertical stripe-like smear due to an intense spot light occurs at a level reaching the saturation level (100%) of the image pickup apparatus. The output signals of the image pickup device of the portion without smear are outputted without change even after the smear correction. Since the device output at the portion of smear, however, stays at 100% due to the saturation of the image pickup device, the output thereof after the smear correction (device output—smear component) becomes "0". Accordingly a vertical black stripe occurs. At this time, if the spot light portion itself is regarded as an image object, "0" output is the outcome also in this portion.

Such vertically extended black stripe or the phenomenon of blacked state of a supposedly very bright object produces a strange image which is quite unnatural. This is an impermissible deterioration of image quality (failed image) for an image pickup apparatus for taking various object scenes, even though a normal image object with a small level of smear can be taken at a higher image quality as compared to the conventional example. Accordingly, there is a problem that the above described smear correction method is difficult to be employed.

In particular, if the smear reaches near the saturation level, it is hardly possible to obtain a luminance information of image object. Hence the prior-art correction is meaningless or produces new false signals to the contrary. This might be mentioned as the state of more harm than good. At least, it has been difficult to obtain an image quality which is not unnatural.

SUMMARY OF THE INVENTION

To solve the above described problems in the prior-art smear correction method, it is an object of the present invention to provide an image pickup apparatus and method of correcting deteriorated pixels thereof in which at least an unnatural deterioration of image quality that possibly results in a failure is prevented from occurring and, at the same time, an effective smear correction with improving practical image quality as compared to the prior art is possible also of those portions for which luminance information of image object cannot be obtained at all due to smears.

It is a further object of the invention to provide an image pickup apparatus and method of correcting deteriorated pixels thereof in which a determination can be made on the basis of the level of smear components in applying compensation of data to deteriorated pixels caused for example by saturation of signal which cannot be handled by the prior-art smear correction.

It is another object of the invention to provide an image pickup apparatus and method of correcting deteriorated pixels thereof in which a more complicated determination can be made by considering both the level of smear components and the output level of effective signal pixels in applying compensation of data to deteriorated pixels caused for example by saturation of signal which cannot be handled by the prior-art smear correction.

It is another object of the invention to provide an image pickup apparatus and method of correcting deteriorated pixels in which a possible generation of unnatural image as a result of unlimited performance of compensation is prevented.

It is another object of the invention to provide an image pickup apparatus and method of correcting deteriorated pixels thereof in which an image can be obtained with reducing or eliminating unnatural, conspicuous false signals typically represented by white stripes which are unavoidable according to thee principle thereof.

It is another object of the invention to provide an image pickup apparatus and method of correcting deteriorated pixels thereof in which an image can be obtained as generally of high quality where smears are mitigated and at the same time unnatural, conspicuous false signals are reduced or eliminated.

In accordance with a first aspect of the invention, there is provided an image pickup apparatus including: smear level detection means for detecting smear level occurring in effective pixels of an image pickup device on the basis of signals outputted from an optically shielded pixel array of the image pickup device in a vertical blanking period thereof; deteriorated pixel determination means for, in the case where the smear level detected at the smear level detection means exceeds a predetermined value, determining corresponding effective pixels as output deteriorated pixels; compensation condition determination means for, when signal from a pixel determined as output deteriorated pixel at the deteriorated pixel determination means is at a predetermined saturation level, determining whether or not the deteriorated pixel satisfies predetermined compensation conditions; and deteriorated pixel correction means for replacing signals from deteriorated pixels determined as satisfying the compensations conditions at the compensation condition determination means with signals of undeteriorated pixels neighboring the deteriorated pixels and for correcting output level of signals from deteriorated pixels not satisfying the compensation conditions in accordance with the smear level detected at the smear level detection means and the saturation level.

The smear level detection means and the deteriorated pixel determination means are thus provided so that, when the detected smear level exceeds a predetermined value, corresponding effective pixels are determined as output deteriorated pixels. Hence it becomes possible to apply compensation of data to pixels which cannot be handled by the prior-art correction due for example to saturation of signal. Further the determination at that time can be made by the smear level alone.

Further, since the compensation condition determination means is provided as for determining whether or not an output deteriorated pixel satisfies predetermined compensation conditions, it is possible to prevent a possible generation of an unnatural image as a result of unlimited compensation.

Furthermore, since the deteriorated pixel correction means is provided as having the above described construction, data compensation based on neighboring undeteriorated pixel signals is performed for those deteriorated pixels determined as satisfying the predetermined conditions. An image is thus obtained with reducing or eliminating unnatural, conspicuous false signals typically represented by white stripes which are unavoidable according to the principle. Moreover, since output level of those deteriorated pixels not satisfying the predetermined conditions is corrected in accordance with the smear level and saturation level, an image is obtained as of a higher quality considering both the smear level and saturation level where smears are mitigated and at the same time unnatural, conspicuous false signals are reduced or eliminated.

The smear level of the image pickup device detected by the smear level detection means in the first aspect of the invention is preferably formed by what is obtained by dividing the sum of signal levels from an optically shielded pixel column having the same horizontal address by the total number of pixels in the same column.

Further, the predetermined compensation conditions in the first aspect of the invention are preferably that at least one undeteriorated pixel column is included within the neighboring four pixel columns at the center of which the pertinent deteriorated pixel column is located.

Furthermore, correction of output level corresponding to the smear level by the deteriorated pixel correction means in the first aspect of the invention is preferably rendered such that the detected smear level is subtracted from a deteriorated pixel level and the result is multiplied by a coefficient based on the saturation level and detected smear level.

In accordance with a second aspect of the invention, there is provided a method of correcting deteriorated pixel signals of image pickup apparatus, including the steps of: detecting smear level occurring in effective pixels of an image pickup device on the basis of signals outputted from an optically shielded pixel array of the image pickup device in a vertical blanking period thereof; in the case where the smear level detected at the smear level detecting step exceeds a predetermined value, determining corresponding effective pixels as output deteriorated pixels; when signal from a pixel determined as output deteriorated pixel at the deteriorated pixel determining step is at a predetermined saturation level, determining whether or not the deteriorated pixel satisfies predetermined compensation conditions; and replacing signals from deteriorated pixels determined as satisfying the compensation conditions at the compensation condition determining step with signals of undeteriorated pixels neighboring the deteriorated pixels and correcting output level of signals from deteriorated pixels not satisfying the compensation conditions in accordance with the smear level detected at the smear level detecting step and the saturation level.

The smear level detecting step and the deteriorated pixel determining step are thus provided so that, when the detected smear level exceeds a predetermined value, corresponding effective pixels are determined as output deteriorated pixels. Hence it becomes possible to apply compensation of data to pixels which cannot be handled by the prior-art correction due for example to saturation of signal. Further the determination at that time can be made by the smear level alone.

Further, since the compensation condition determining step is provided as for determining whether or not an output deteriorated pixel satisfies predetermined compensation conditions, it is possible to prevent a possible generation of an unnatural image as a result of unlimited compensation.

Furthermore, since the deteriorated pixel correcting step is provided in the above described manner, data compensation based on neighboring undeteriorated pixel signals is performed for those deteriorated pixels determined as satisfying the predetermined conditions. An image is thus obtained with reducing or eliminating unnatural, conspicuous false signals typically represented by white stripes which are unavoidable according to the principle. Moreover, since output level of those deteriorated pixels not satisfying the predetermined conditions is corrected in accordance with the smear level and saturation level, an image is obtained as of a higher quality considering both the smear level and saturation level where smears are mitigated and at the same time unnatural, conspicuous false signals are reduced or eliminated.

Further, the smear level of the image pickup device detected at the smear level detecting step in the second aspect of the invention is preferably what is obtained by dividing the sum of signal levels from an optically shielded pixel column having the same horizontal address by the total number of pixels in the same column.

Furthermore, the predetermined compensation conditions in the second aspect of the invention are preferably that at least one undeteriorated pixel column is included within the neighboring four pixel columns at the center of which the pertinent deteriorated pixel column is located.

Moreover, correction of output level corresponding to the smear level at the deteriorated pixel correcting step in the second aspect of the invention is preferably such that the detected smear level is subtracted from a deteriorated pixel level and the result is multiplied by a coefficient based on the saturation level and detected smear level.

DESCRIPTION OF THE PREFERRED EMBODIMENT

Figure 1:
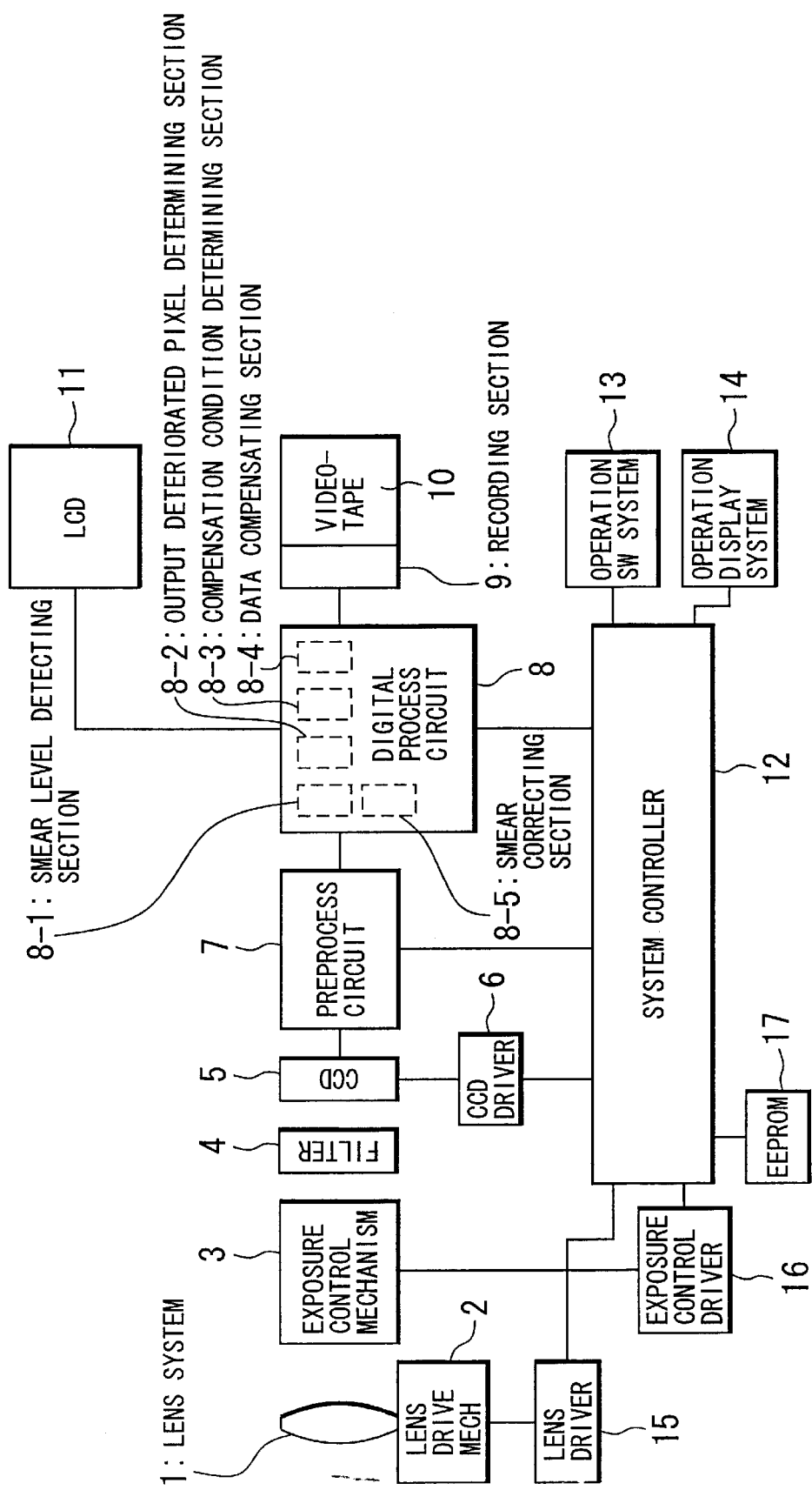
FIG. 1 is a block diagram showing construction of digital video camera of an embodiment of the image pickup apparatus according to the present invention.

An embodiment of the present invention will now be described. FIG. 1 is a block diagram showing a digital video camera as an embodiment of the image pickup apparatus according to the invention. Included in FIG. 1 are: 1, lens system; 2, lens drive mechanism; 3, exposure control mechanism; 4, filter system; 5, CCD image pickup device; 6, CCD driver; 7, preprocess circuit including an analog-to-digital converter; 8, digital process circuit including a memory as hardware, for performing all the digital processing. Also shown are: 9, recording section (VTR block); 10, videotape; 11, LCD image display system; 12, system controller including a microcomputer as its main component; 13, operation switch system; 14, operation display system including an indicating LCD; 15, lens driver; 16, exposure control driver; 17, EEPROM.

In thus constructed digital video camera, all control is comprehensively performed by the system controller 12. The exposure control mechanism 3 formed as an iris diaphragm and drive of the CCD image pickup device 5 by the CCD driver 6 are controlled to perform exposure (charge accumulation) and readout of signals at a predetermined dynamic image rate. These are temporarily stored to the digital process circuit 8 through the preprocess circuit 7 including an analog-to-digital converter. After subjected to predetermined types of signal processing therein, these are transmitted to the recording section 9 and recorded on the videotape 10.

The types of signal processing to be performed at the digital process circuit 8 include smear correction processing, a main subject of the invention, which uses information of output level of vertical OB pixels. In particular, the digital process circuit 8 includes: a smear level detecting section 8-1. for detecting output level of vertical OB pixels; an output deteriorated pixel determining section 8-2 for determining output deteriorated pixels based such as on the output of detection of the smear level detecting section 8-1; a compensation condition determining section 8-3 for determining with respect to output deteriorated pixels whether predetermined compensation conditions are satisfied or not; a data compensating section 8-4 for performing data compensation of those deteriorated pixels determined as satisfying the compensation conditions; and a smear correcting section 8-5. (Although the sections 8-1 to 8-5 are not necessarily clearly separated from each other in actual operation processing, these are shown as separated for ease of explanation and clarification of concepts.) All of these types of processing are of course performed at a speed sufficient for the recording by the above described predetermined dynamic image rate, i.e., as the so-called real-time processing.

A description will now be given with respect to control of camera by the system controller 12 with focusing on the processing directly related to smear correction of the invention. First, imaging output signals corresponding to one frame obtained by sequentially reading signal charges of the CCD image pickup device 5 produced by an exposure in the above described operation are stored to a predetermined memory region of the digital process circuit 8. The output of vertical OB pixels is then used at the smear level detecting section 8-1 to detect smear components so as to compute a smear eliminating reference signal. In such computation, of data of the OB pixels which are provided in a plurality of lines, the sum of every those pixels having the same horizontal address is divided by such pixel number to obtain a mean value as required in a similar manner as the prior-art technique as disclosed in the above cited laid-open application. While the smear eliminating reference signal is formed of image signals corresponding to one line, the mean value obtained by the above operation is used as the value of each one pixel signal of such image signals corresponding to one line. Thus obtained smear eliminating reference signal is expressed as Sm(i). Here horizontal address is represented by "i" and vertical address is represented by "j" to be shown below.

The smear eliminating reference signal is then used at the output deteriorated pixel determining section 8-2, the compensation condition determining section 8-3, the data compensating section 8-4 and the smear correcting section 8-5 so as to correct imaging output signals Sig(i,j) of an effective image region. The smear correction processing of the invention is characterized in that: different types of processing are performed corresponding to the level of the imaging output signals and smear at that time; and, of those yet impossible to be corrected according to the principle, those capable of predetermined compensation processing are compensated for by using information of neighboring pixels. Supposing the saturation level of the image pickup device (or signal processing system receiving output therefrom) as "Sat", predetermined levels of comparison as "R1" and "R2" (0<R1<R2<Sat), and output after smear correction as Sout (i,j) (where naturally 0≦Sm(i)≦Sig(i,j)≦Sat), the actual signal processing in the present embodiment is as follows.

The fundamental signal processing is represented by:

$$\text{Sout}(i,j)=S1(i,j)\equiv\{\text{Sig}(i,j)-\text{Sm}(i)\}\times\text{Sat}/\{\text{Sat}-\text{Sm}(i)\} \tag{1}$$

The significance of the smear correction signal processing of this embodiment will now be described. A comparative conventional processing is expressed as:

$$\text{Sout}(i,j)=\text{Sig}(i,j)-\text{Sm}(i) \tag{2}$$

In the case of such conventional processing, while examples that are specifically easy to be understood are shown as the problems in the above described prior-art technique, these can be generalized as a problem that the range of output signal becomes smaller. In particular, the maximum value of output signal Sout(i,j) after smear correction is smaller correspondingly to the smear level and becomes [Sat−Sm(i)].

Figure 2A:
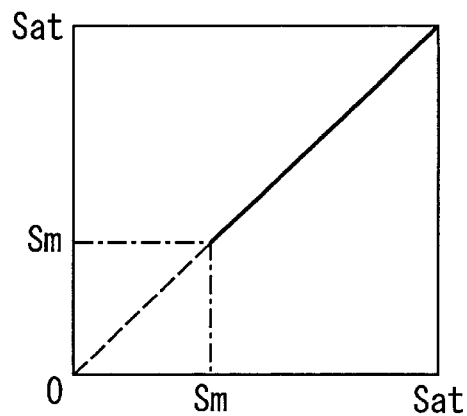
FIGS. 2A and 2B respectively are an input/output characteristic without correction and an input/output characteristic at the time of prior-art smear correction, shown for comparison with the smear correction in an embodiment of the present invention.
Figure 2B:
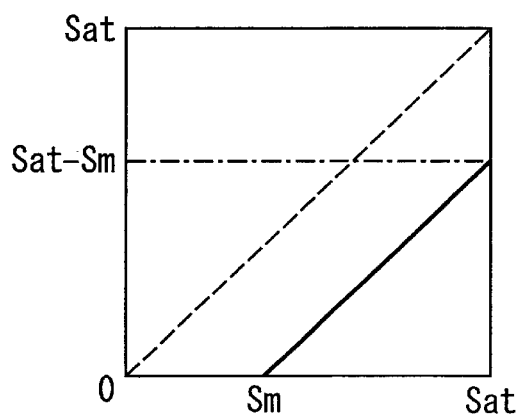

In extreme cases, the above described black stripe is produced. Even if it is not that bad, when "saturation occurs, i.e., Sig(i,j)=Sat" and "smears exist, i.e., Sm(i)>0", stripes of gray to black are caused to occur correspondingly to the level of such smears. An extremely unnatural and strange image is produced as compared to the white stripes at the time without correction. These manners are shown in graph as in FIGS. 2A and 2B. FIG. 2A shows an input/output characteristic in the case of no correction; and FIG. 2B shows an input/output characteristic according to the conventional processing. It is seen from the characteristic of FIG. 2B that the maximum value becomes smaller though only the true signal components are obtained.

By contrast, with S1(i,j) of the above described formula (1) in the present embodiment, an output Sout(i,j)=Sat is obtained by substituting Sig(i,j)=Sat. Although such portion in this case results in a white output at the saturation level due to the effect of smears or the high luminance of the image object itself, it is at least an equivalent to that in a conventional image without correction. Hence there is no possibility of producing a strange image as in the above described prior-art smear correction.

Figure 3:
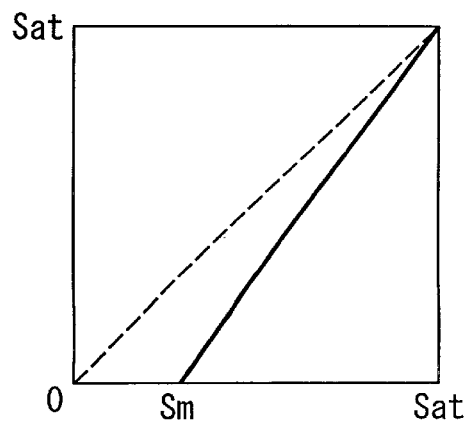
FIG. 3 is an input/output characteristic of the smear correcting section for explaining the manner of smear correction in the embodiment shown in FIG. 1.

The conversion (input/output) characteristic corresponding to $S1(i,j)$ of the formula (1) is shown in FIG. 3. Upon the comparison between the characteristic of FIG. 3 and the characteristic shown in FIG. 2B, it is seen that the characteristic of FIG. 3 according to the present embodiment, toward the lower luminance, is getting closer to the values of the characteristic shown in FIG. 2B formed of the true signal components alone (coincidence occurring at signal component=0) and the same toward the higher luminance is getting closer to the values without correction (coincidence occurring at $Sig(i,j)=Sat$). Since in case of a relatively small level of smear occurrence, the smear tends to be visible especially in a low-luminance image object, $S1(i,j)$ of formula (1) effectively achieves, though as a result of compromise, both the advantage of correcting smears and the elimination of unfavorable phenomena in the above described prior-art.

Although performance of such smear correction eliminates the disadvantage of the prior-art smear correction method, it is also a fact that white stripes, etc., are produced in a similar manner as in the conventional case of no correction if a saturation occurs of the image pickup device output. In this case, since information of image object cannot be obtained with respect to the saturated pixels, nothing can be done according to the principle.

Here a prominent characteristic of the invention is that the state of deterioration is determined also of those pixels with deteriorated pixel information due to such smears; if predetermined conditions are also satisfied, those deteriorated pixels are regarded similarly as pixel defects; and an attempt for a little more improvement of practical image quality (in aesthetic perception) is made by performing compensation processing using neighboring pixels, etc.

Specifically, supposing R ($\neq 0$) as a predetermined reference level, determination with respect to deteriorated pixels is made by the deterioration criteria of the following (1) to (4).

(1) The Case of $Sm(i)=Sat$ (Smear Level Reaching Saturation where $Sig(i,j)=Sat$ is a Necessary Result)

In this case, the pixel is determined as a deteriorated pixel, since it is a pixel of which output is deteriorated due to the effect of smear. There is no object image information.

(2) The Case of $Sm(i)>R$ and $Sig(i,j)=Sat$

In this case, the pixel is determined as a deteriorated pixel, since there is a high probability of its being a pixel of which output is deteriorated due to the effect of smear. There is likewise no object image information.

(3) The Case of $Sm(i)>R$ and $Sig(i,j)<Sat$

In this case, the pixel is determined as not a deteriorated pixel and as having object image information, though a high level of smear exists.

(4) The Case of $Sm(i) \leq R$

In this case, the pixel is determined as not a deteriorated pixel. (Although the effect of smears is possible also on saturated pixels, the main cause is presumably that the level of the image object itself is high.)

Those pixels determined as deteriorated pixel are subsequently subjected to the compensation condition determination for determining whether a predetermined compensation condition is satisfied or not. Such condition is that one of the pixels near the pertinent pixel signal $Sig(i,j)$ on the left or right side thereof is not a deteriorated pixel. Specifically, the following condition is used.

[Compensation condition: at least one column not containing deteriorated pixel (undeteriorated pixel column) must exist in the columns of i−2, i−1, i+1, i+2. In other words, at least one undeteriorated pixel column must be contained in the neighboring four pixel columns at the center of which the pertinent deteriorated pixel column is located.]

While the compensation processing is to be performed for those deteriorated pixels satisfying the compensation condition, correction of smear by $S1(i,j)$ of the above described formula (1) is performed prior to this for all the pixels (or at least for undeteriorated pixels and those deteriorated pixels not satisfying the compensation condition). In other words, data after such smear correction is used in the compensation processing.

The content of the compensation processing is specifically as follows.

If one or the other of $Sig(i−1,j)$ and $Sig(i+1,j)$ is an undeteriorated pixel, the pixel information of the undeteriorated pixel (or the mean value thereof if both are undeteriorated pixels) is assigned for the value of the pertinent $Sig(i,j)$; if not, i.e., if both $Sig(i−1,j)$ and $Sig(i+1,j)$ are deteriorated pixels, the pixel information of one or the other of $Sig(i−2,j)$ and $Sig(i+2,j)$ (or the mean value thereof if both are not deteriorated) is assigned for the same. In short, compensation processing is performed by replacing it with a neighboring undeteriorated pixel signal.

In other words, the deteriorated pixels are replaced by information (information reflecting object image information) of the undeteriorated pixels within 2 pixels on the left or right side thereof. Hence, for example, a white stripe occurring due to smear in the conventional example can be reduced by four pixels at most in width. Naturally, if within 4 pixels in width, it is caused to disappear by the compensation processing. If such processing is performed without limit for example for the width of a very large number of pixels, an unnatural image is certainly produced. If limited to on the order of several pixels, however, the unnaturalness is not that conspicuous and a great advantage is obtained that considerably unnatural, conspicuous false signals, i.e., white stripes can be reduced or eliminated.

Performance of the smear correction processing including the compensation processing as the above generally results in smear correction of high image quality where, while, for smears occurring at relatively low level, an adequate correction effect is maintained in a relatively similar manner as the prior-art smear correction (i.e., an output closer to the object image signal proper is obtained in the low luminance portion of the image object where smears tend to be conspicuous), disadvantages due to saturation of signals that occur in the prior-art correction are greatly reduced. In particular, at the same time of providing a correction characteristic so as not to produce strange, unnatural false signals such as a black stripe which might be defined as an image quality failure, those unnatural, conspicuous false signals such as a white stripe unavoidable according to the principle are reduced or eliminated.

After the smear correction processing as the above, the output image signals $Sout(i,j)$ are suitably subjected to various types of signal processing and then recorded on the videotape 10 or displayed on the LCD image display system 11. The image to be recorded or displayed is of high image quality where smears are effectively corrected and unnatural false signals do not occur.

It should be noted that the digital video camera according to the present embodiment has a known means for pixel defect compensation which is separate from the compensation processing in the above described smear correction but is included in the above described various types of signal processing. Such processing is rendered for the output signals after the smear correction corresponding to the effective pixel portion on the basis of the defect pixel address data stored in the EEPROM 17. At this time, there is a significance in performing the smear correction first and then pixel defect compensation. The reason is as follows. In particular, output signals of different horizontal address are usually used in pixel defect compensation. Hence, if the pixel defect compensation is performed first by simply reversing the order of processing, it is unfavorable that the smear correction is not performed correctly and causes new false signals.

It should be noted that various other embodiments are possible in addition to the above described embodiment. For example, the correction of S1(i,j) of formula (1) to be performed before the compensation processing can be of an optional correction characteristic including a known smear correction. Although, depending on thus employed correction characteristic in this case, there is a possible case not necessarily capable of obtaining a generally adequate image quality, it is not different at least in achieving the same advantage that rather unnatural, conspicuous false signals, i.e., white stripe, impossible to be mitigated in the conventional example is reduced or removed. If the correction characteristic to be employed is superior to that of the above embodiment, the general image quality becomes even more favorable by a combination thereof.

Besides, the compensation conditions and compensation processing have been explained in a relatively simple form in the above description. These can be applied without modification if the image pickup device is of monochrome. In the case of a single-sensor color image pickup device, however, the above description as read literally is in some cases difficult to be applied because of color coding. In this case, however, it suffices to notice the smallest unit for obtaining color information of such color coding (possibly defined as a pixel concerning colors) which replaces "one pixel" in reading the above embodiment. Thus the present invention can also be applied in a similar manner to a color image pickup apparatus.

Further, outputs corresponding to the so-called vertical OB pixels are used for smear detection by way of an example only in the above described embodiment. Even if actually corresponding photoelectric conversion elements (pixel accumulating portion) do not exist, detection of smears is similarly possible by using image pickup device output corresponding to a vertical blanking period. It is hence obvious that these can be replaced by such known construction.

Furthermore, while the above embodiment is mainly for recording dynamic images, it can be naturally applied without modification to the taking of a static image, since the signal processing is performed by an image of one frame alone (intraframe processing). For example, preferred embodiments are respectively achieved by applying it to a static image taking mode additionally provided of the above described camera or to a separate digital still camera mainly for taking a still picture. Of course, the above description does not purport to limit the scope of the present invention to intraframe procreating, and it is obviously applicable also to interframe processing.

While some embodiments of the present invention have been specifically described, the present invention is not limited to these and naturally can take any form within the scope as set forth in its claims.

What is claimed is:

1. An image pickup apparatus comprising:
   smear level detection means for detecting smear level occurring in effective pixels of an image pickup device on the basis of signals outputted from an optically shielded pixel array of the image pickup device in a vertical blanking period thereof;
   deteriorated pixel determination means for, in the case where the smear level detected at said smear level detection means exceeds a predetermined value, determining corresponding effective pixels as output deteriorated pixels;
   compensation condition determination means for, when signal from a pixel determined as output deteriorated pixel at said deteriorated pixel determination means is at a predetermined saturation level, determining whether or not the deteriorated pixel satisfies predetermined compensation conditions; and
   deteriorated pixel correction means for replacing signals from deteriorated pixels determined as satisfying the compensation conditions at said compensation condition determination means with signals of undeteriorated pixels neighboring the deteriorated pixels.

2. The image pickup apparatus according to claim 1, said deteriorated pixel correction means performs a correction of output level of signals from deteriorated pixels not satisfying said compensation conditions in accordance with the smear level detected at said smear level detection means.

3. The image pickup apparatus according to claim 1, wherein the smear level of the image pickup device detected by said smear level detection means is what is obtained by dividing the sum of signal levels from an optically shielded pixel column having the same horizontal address by the number of pixels in the same column.

4. The image pickup apparatus according to claim 1, wherein said predetermined compensation conditions comprise the condition that at least one undeteriorated pixel column is included within the neighboring four pixel columns at the center of which the pertinent deteriorated pixel column is located.

5. The image pickup apparatus according to claim 2, wherein the correction of output level corresponding to the smear level by said deteriorated pixel correction means comprises the correction that the detected smear level is subtracted from a deteriorated pixel level and the result is multiplied by a coefficient based on the saturation level and the detected smear level.

6. A method of correcting deteriorated pixel signals of image pickup apparatus, including the steps of:
   detecting smear level occurring in effective pixels of an image pickup device on the basis of signals outputted from an optically shielded pixel array of the image pickup device in a vertical blanking period thereof;
   in the case where the smear level detected at said smear level detecting step exceeds a predetermined value, determining corresponding effective pixels as output deteriorated pixels;
   when signal from a pixel determined as output deteriorated pixel at said deteriorated pixel determining step is at a predetermined saturation level, determining whether or not the deteriorated pixel satisfies predetermined compensation conditions; and
   correcting deteriorated pixels by means of replacing signals from deteriorated pixels determined as satisfying the compensation conditions at said compensation condition determining step with signals of undeteriorated pixels neighboring the deteriorated pixels.

7. The method of correcting deteriorated pixel signals of image pickup apparatus according to claim 6, said deteriorated pixel correcting step comprises a step of correcting output level of signals from deteriorated pixels not satisfying said compensation conditions in accordance with the smear level detected at said smear level detecting step.

8. The method of correcting deteriorated pixel signals of image pickup apparatus according to claim 6, wherein the smear level of the image pickup device detected at said smear level detecting step is what is obtained by dividing the sum of signal levels from an optically shielded pixel column having the same horizontal address by the number of pixels in the same column.

9. The method of correcting deteriorated pixel signals of image pickup apparatus according to claim 6, wherein said predetermined compensation conditions comprise the condition that at least one undeteriorated pixel column is included within the neighboring four pixel columns at the center of which the pertinent deteriorated pixel column is located.

10. The method of correcting deteriorated pixel signals of image pickup apparatus according to claim 7, wherein the correction of output level corresponding to the smear level at said deteriorated pixel correcting step comprises the correction that the detected smear level is subtracted from a deteriorated pixel level and the result is multiplied by a coefficient based on the saturation level and the detected smear level.

* * * * *